No. 808,654. PATENTED JAN. 2, 1906.
E. E. HARTGRAVE.
VALVE.
APPLICATION FILED NOV. 15, 1904.
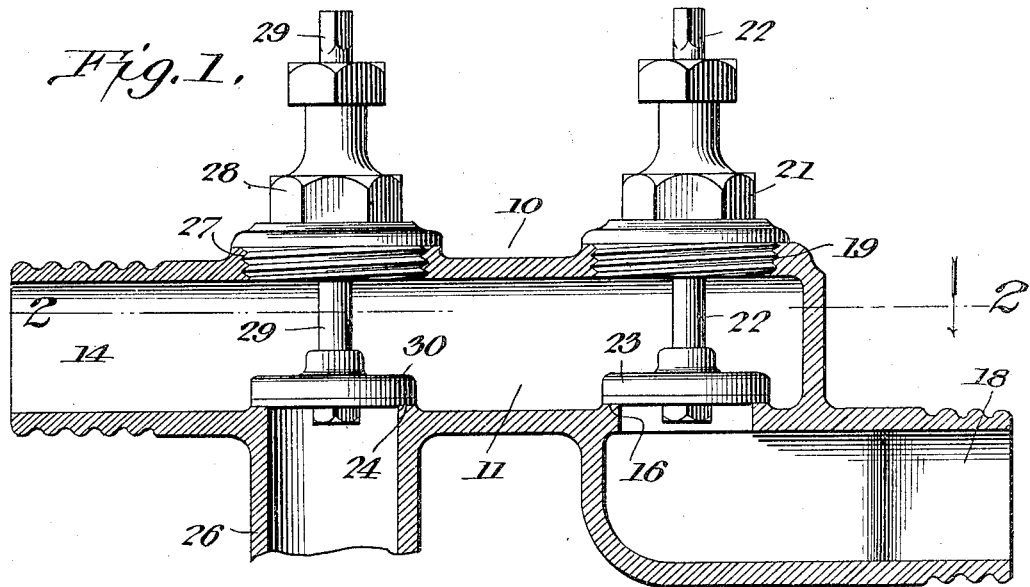
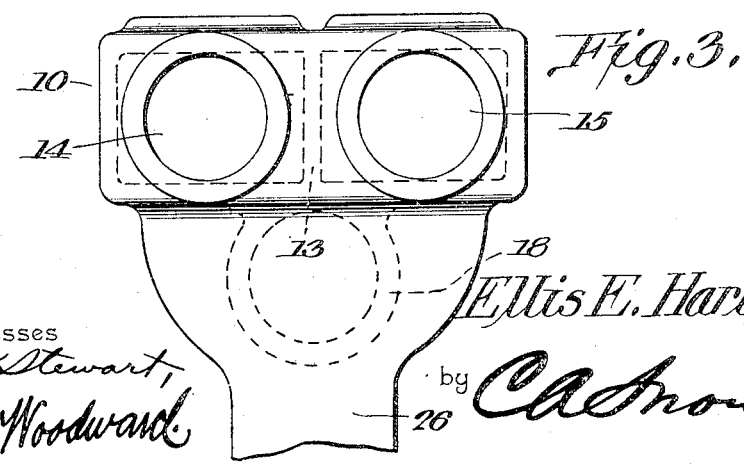
Witnesses
Ellis E. Hartgrave, Inventor,
by C. A. Snow & Co.
Attorneys

UNITED STATES PATENT OFFICE.

ELLIS EVERETTE HARTGRAVE, OF WYNDMERE, NORTH DAKOTA.

VALVE.

No. 808,654.          Specification of Letters Patent.          Patented Jan. 2, 1906.

Application filed November 15, 1904. Serial No. 232,880.

*To all whom it may concern:*

Be it known that I, ELLIS EVERETTE HARTGRAVE, a citizen of the United States, residing at Wyndmere, in the county of Richland and State of North Dakota, have invented a new and useful Valve, of which the following is a specification.

This invention relates to the class of valves having a plurality of passages therethrough, and having means for controlling the direction of the flow of the liquids through the same, and has for its object to improve the construction and increase the efficiency of devices of this character.

With these and other objects in view, which will appear as the nature of the invention is better understood, the same consists in certain novel features of construction as hereinafter fully described and claimed.

In the accompanying drawings, forming a part of this specification and in which corresponding parts are denoted by like designating characters, is illustrated the preferred form of the embodiment of the invention, capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a longitudinal sectional elevation. Fig. 2 is a sectional view on the line 2 2 of Fig. 1. Fig. 3 is an end elevation of the casing with the valves removed.

The improved device comprises a casing 10, divided into longitudinal compartments 11 12 by a partition 13 and with pipe or hose connections 14 15 at one end of the compartments and valve-seats 16 17 at the other end, the valve-seats communicating with a single pipe or hose connection 18 common to both valve-seats. The connections 14 15 are shown provided with screw-threads for connecting ordinary pipe-couplings thereto, and the connection 18 is shown provided with spaced annular ribs for connecting a hose, the pipe-coupling and hose not being shown as they form no part of the present invention and as their constructions are so well known. In the ordinary use of the invention the connections will be arranged as shown, but it is obvious that all the connections may be threaded or all provided with means for attaching hose or otherwise modified in this respect as may be required. Opposite the seats 16 17 threaded apertures are formed in the casing 10, one of which is shown at 19 for receiving valve-packing members, one of which is shown at 21 for supporting valve-stems, one of which is shown at 22, the stems in turn carrying valves, one of which is shown at 23 for bearing upon the valve-seats 16 17. By this means it is obvious that communication between the compartments 11 and 12 and the single outlet 18 may be controlled and the fluids caused to pass back and forth independently or in any manner desired. Valve-seats 24 25 are also formed in one of the walls of the compartments 11 12 between the seats 16 17 and the connections 14 15 and communicating with a single branch 26.

Threaded apertures, one of which is shown at 27, are formed in the casing 10 in alinement with the seats 24 25 and supporting valve-packing members, one of which is shown at 28, valve-stems, one of which is shown at 29, and valves, one of which is shown at 30, for bearing upon the seats 24 25 and providing independent communication between the compartments 11 12 and the branch 26.

The improved valve herein described may be employed in connection with various structures or apparatus, but is more particularly designed for use in connection with the "tenders" or water tanks or vehicles used with thresher-engines and for similar purposes, and when thus employed the single branch member 26 will be inserted into the tank or tender and the supply-hose for the engine-pump connected to the single connection 18. The connections 14 15 are connected by suitable piping, respectively, to the intake and outtake connections of the feed-pump of the engine. The hose member to be coupled to the connection 18 may lead into a well, creek, pond, or other source of supply or connected to the heater or other means of supplying the boiler or connected to a fire-hose or for any other desired purpose. Thus when it is required to fill the tank the receiving end of the hose will be led into the well, pond, or other source of supply and the valves over the valve-seats 17 24 will be closed and the valves over the seats 16 25 open with the result of causing the water to pass through the compartment 11 to the pump and thence back again into the compartment 12 and branch 26 to the tank. If it is required to exhaust the tank for any purpose, such as for cleansing the same or to employ the hose in extinguishing a fire or like purpose, the valves on the seats 16 25 will be closed and the valves on the seats 17 24 opened, with the result of reversing the direction of the water, as will be obvious. If it is desired to supply water to the boiler, the hose is coupled to the heater or feed valve and the valves arranged to draw water from the tank, as above noted. By this simple means the water may be conducted in any desired direction.

The device is simple in construction, can be inexpensively manufactured, and may be effectually employed for a variety of purposes.

Having thus fully described the invention, what is claimed is—

1. In a valve, a casing divided into longitudinal compartments, connected into a single outlet at one end and with each compartment provided with an independent inlet at the other end, and with a branch outlet connected to said compartments intermediately of the ends, and valves independently operating between said compartments and said single outlet, and valves operating between said compartments and said branch outlets.

2. In a valve, a casing divided into longitudinal compartments, connected into a single outlet at one end and with each compartment provided with an independent inlet at the other end, valve-seats between said compartments and said single outlet, threaded apertures in said casing in alinement with said valve-seats, valve-stem packing members engaging said threaded apertures and valves operating upon said valve-seats and having stems passing through said packing members.

In testimony that I claim the foregoing as my own I have hereto affixed my signature in the presence of two witnesses.

ELLIS EVERETTE HARTGRAVE.

Witnesses:
J. McGANN,
R. E. HAMRY.